(No Model.)

W. WEBER.
BALANCING AND LEVELING DEVICE FOR MILLSTONES.

No. 546,500. Patented Sept. 17, 1895.

Witnesses

Inventor
William Weber,
By his Attorney

UNITED STATES PATENT OFFICE.

WILLIAM WEBER, OF PHILADELPHIA, PENNSYLVANIA.

BALANCING AND LEVELING DEVICE FOR MILLSTONES.

SPECIFICATION forming part of Letters Patent No. 546,500, dated September 17, 1895.

Application filed July 25, 1894. Renewed August 10, 1895. Serial No. 558,936. (No model.)

*To all whom it may concern:*

Be it known that I, WILLIAM WEBER, a citizen of the United States, residing in the city and county of Philadelphia, State of Pennsylvania, have invented a new and useful Improvement in Balancing or Leveling Devices for Millstones, which improvement is fully set forth in the following specification and accompanying drawings.

My invention consists of an improved balancing or leveling device for millstones, which is adapted to be readily attached to existing stones, and to act, in combination with properly adjusted weights, to accurately balance the runner, all as will be hereinafter set forth.

Figure 1:
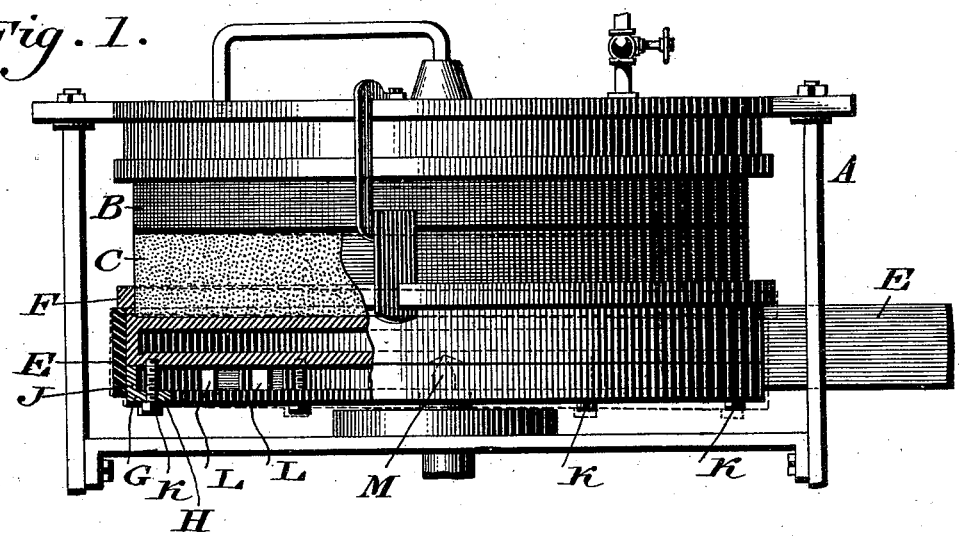
Figure 2:
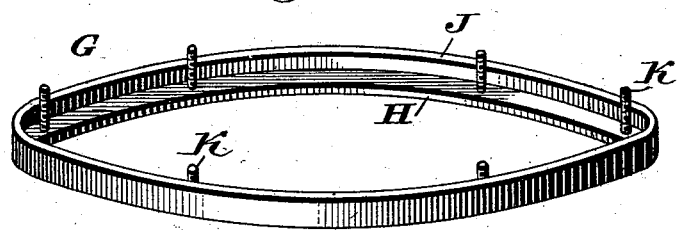
Figure 3:
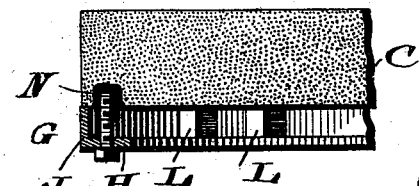

Figure 1 represents a side elevation of a millstone having a portion broken away, and showing in position a balancing device embodying my invention. Fig. 2 represents a perspective view of said balancing device detached. Fig. 3 represents a detail view of a modification to be hereinafter referred to.

Similar letters of reference indicate corresponding parts in the several figures.

Referring to the drawings, A designates a mill, B designates the upper or stationary millstone, and C designates the lower stone or runner, which is rotated in any suitable manner, as in the present instance by the belt E, which passes around the ring F which supports the said runner C.

G designates the balancing device, which is secured to the under side of said supporting-ring F, the same consisting of the flat ring or hoop H of iron, steel, or other suitable material, which has the upturned edge or flange J, the top of which is in contact with the under side of the ring F when the parts are in the position seen in Fig. 1.

K designates bolts, which in the present instance are employed to hold the ring G in place.

L designates weights, which may be pieces of lead or other suitable material, which are tightly inserted or driven between the hoop H and the part to which it is attached for the purpose of balancing the runner C when necessary.

M designates a pivot or post upon which the runner is supported. The hoop H of the device can be attached directly to the lower stone or runner C if desired, the bolts for supporting the same being embedded in lead or other suitable material which is held in a recess N in the under side of said stone.

The operation is as follows: When the runner revolves, if it does not balance accurately, the weights L are adjusted in the proper places between the hoop H and the part to which the same is attached until the proper balance is attained, the effect of which will be evident. The periphery of the flange J may have a portion of the belt E run around the same, as shown in Fig. 1.

It will be noticed that the herein described balancing device can be readily attached to the runner of any existing mill without necessitating taking the same apart or disconnecting any of the operative parts thereof or stopping of the mill for any considerable length of time.

Having thus described my invention, what I claim as new, and desire to secure by Letters Patent, is—

1. In a balancing and leveling device for mill stones a flat hoop, having an upturned edge, weights adjustable on said hoop, and means for securing said hoop in place, said parts being combined substantially as described.

2. The herein described ring G, having the hoop H, and flange J, and adapted to be attached to the runner of a mill or to its supporting device, for the purpose described.

3. In a mill, the combination of the runner C, the supporting ring F, and the balancing device G attached thereto, a portion of said balancing device being adapted to form a bearing for the belt which rotates said runner, substantially as described.

4. In a mill, the runner C, the supporting ring F, and the balancing device G having a flange J adapted to form a bearing for the belt which rotates the runner, and having also the hoop H adapted to support weights, substantially as described.

WILLIAM WEBER.

Witnesses:
JOHN A. WIEDERSHEIM,
R. H. GRAESER.